J. E. BORDENKIRCHER.
SHEAVE OR PULLEY.
APPLICATION FILED NOV. 27, 1908.

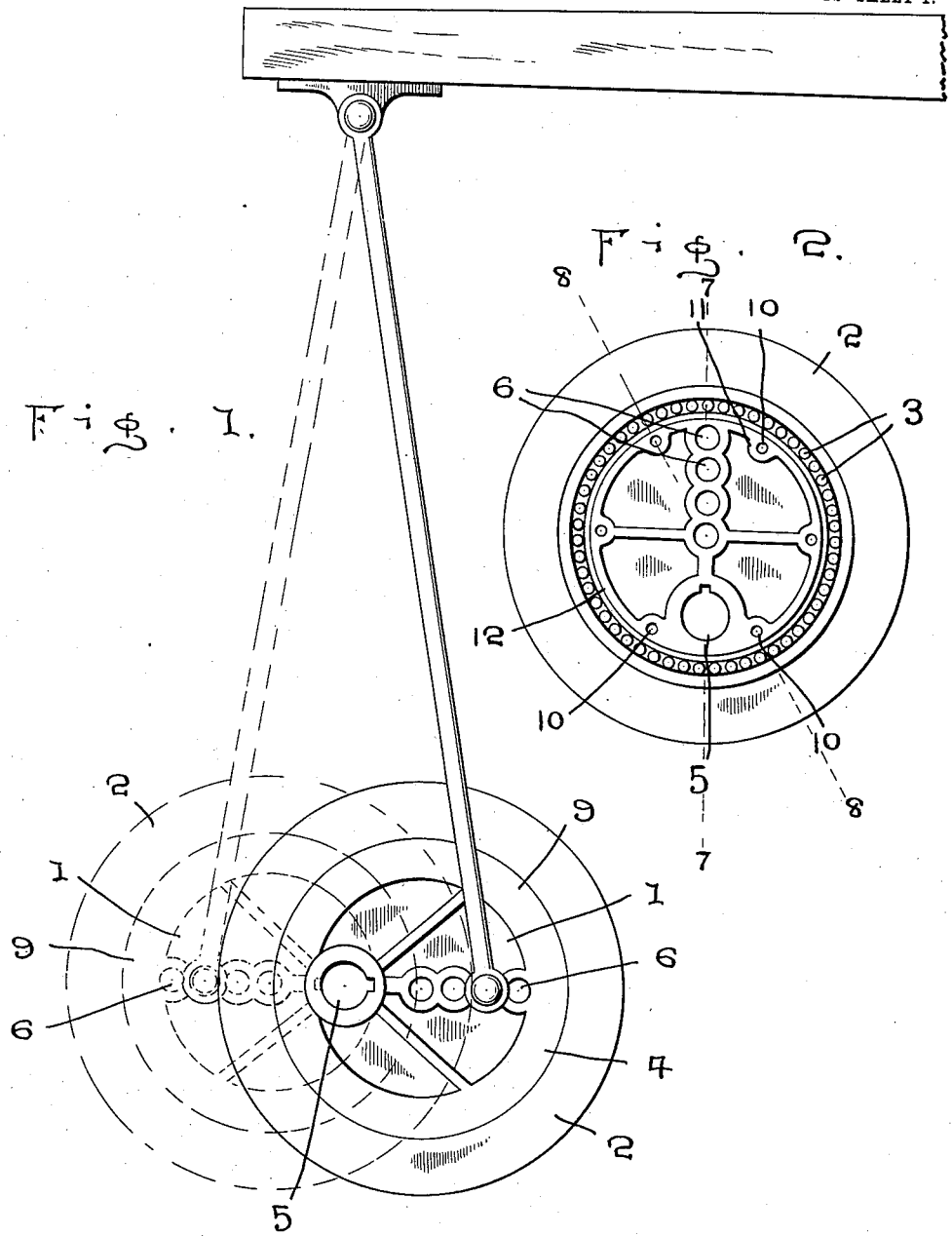

936,213.

Patented Oct. 5, 1909.
2 SHEETS—SHEET 2.

WITNESSES:
Thos. W. Riley
M. A. Newcomb

INVENTOR
J. E. Bordenkircher
BY
W. J. Fitzgerald & Co.,
Attorneys

UNITED STATES PATENT OFFICE.

JOHN EDWARD BORDENKIRCHER, OF CUYAHOGA FALLS, OHIO, ASSIGNOR OF ONE-HALF TO JACOB HARTZ, OF AKRON, OHIO.

SHEAVE OR PULLEY.

936,213.    Specification of Letters Patent.    Patented Oct. 5, 1909.

Application filed November 27, 1908. Serial No. 464,523.

*To all whom it may concern:*

Be it known that I, JOHN E. BORDENKIRCHER, a citizen of the United States, residing at Cuyahoga Falls, in the county of Summit and State of Ohio, have invented certain new and useful Improvements in Sheaves or Pulleys; and I do hereby declare the following to be a full, clear, and exact description of the invention, such as will enable others skilled in the art to which it appertains to make and use the same.

My invention relates to new and useful improvements in eccentric sheaves or pulleys, more particularly to the adaptation of such sheaves or pulleys for the reception of roller bearings, such sheaves or pulleys being used in connection with drilling machines.

Said invention has for its object to substitute for the crank member in that class of machines above-referred to, an eccentric sheave or wheel, whereby may be dispensed with parts which have been found to be unnecessary for the work to be performed.

It also has for its object to reduce friction to the minimum, thereby promoting easy running of the parts and strength and durability.

Other objects and advantages will be hereinafter referred to and more particularly pointed out in the claims.

In describing the invention in detail, reference will be had to the accompanying drawings forming part of this specification, wherein like characters of reference designate corresponding parts in the several views, and wherein—

Figure 3:
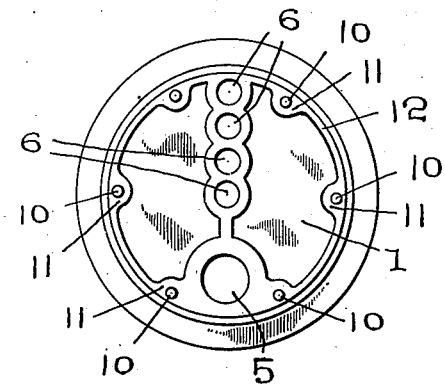
Figure 4:
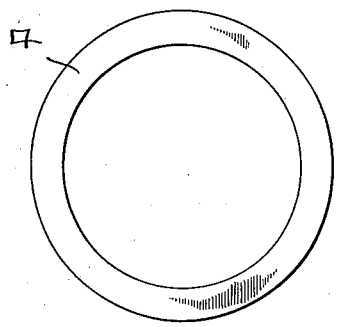
Figure 5:
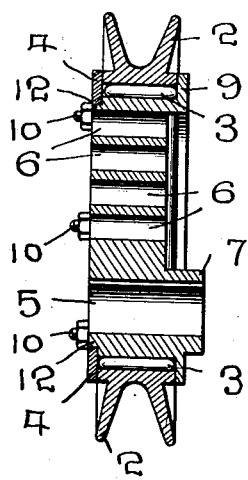
Figure 6:
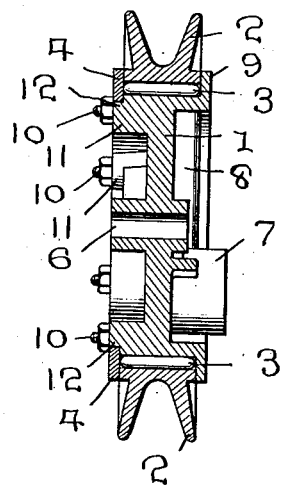

Figures 1 and 2 are opposite side views of the sheave or pulley, Fig. 1 showing the practical application thereof. Fig. 3 is a detached view of the central member having the eccentric axis-receiving opening and crank-pin openings. Fig. 4 is a detached view of the roller bearing retaining ring. Fig. 5 is a section taken on the line 7—7, Fig. 2. Fig. 6 is a section taken on line 8—8, Fig. 2.

In carrying out my invention, I form or contrive the pulley or sheave of a central member 1, a perimetric grooved member 2, a series of pins or rollers 3 and a ring or annular member 4. The central member 1 has an eccentric opening 5 therethrough for the reception of the driven shaft of a drilling machine of the character to which this pulley is particularly applicable, said central member also having a plurality or a number of crank-pin receiving openings 6 for varying the point of connection therebetween and the connecting rod of a walking beam, as may be found necessary in changing the stroke thereof, as will be readily understood from Fig. 9.

It will be noted that that portion of the central member 1 provided with the crank-pin receiving openings 6, has its outer edge flush with the ring member 4 and is preferably of skeleton-structural outline, which renders the pulley or sheave lighter than would otherwise be the case, while the hub portion surrounding the shaft receiving opening 5 of said central member, projects a short distance beyond one face of said central member.

As indicated the central member 1 has projecting from one side thereof, the usual shaft receiving hub 7, said member also being countersunk, as it were, upon the same side as at 8 and terminating beyond the same with an annular flange 9.

The roller bearings or pins 3 are arranged around the central member 1 with one end of each of the same bearing against the flange 9, while the opposite ends thereof are confined by means of an annular ring or member 4, said ring being suitably held in place by nut-equipped screw threaded studs 10, said nuts bearing against said ring at its inner edge. The central member 1 is provided with a series of inwardly extending projections 11, from which said screw-threaded studs project, said central member also having an annular diametrically reduced extension 12 bearing said projections 11 and upon which extension fits the ring or annular member 4, as is clearly seen in Figs. 5 and 6.

The grooved perimetric member 2 is borne or carried by the roller bearings 3 in order to reduce friction to the minimum and it is designed to receive a belt preferably of the rope or hemp type (not shown) such as is used in the class of machines herein referred to.

As has previously been noted, by means of the foregoing construction of parts, a pulley or sheave is provided to replace the ordinary crank used in drilling machines and whereby the attachment of the crank-pin with the pulley or sheave may be varied for controlling the throw or stroke of the walking beam connecting rod and the sheave or wheel proper which receives the rope or hemp belt, is provided with a practically frictionless bearing.

I claim:

1. A sheave or pulley comprising a central member having an eccentric axis-receiving-opening and a series of crank-pin receiving openings arranged radially with relation to said axis receiving opening, said central member also having an annular perimetric flange, a peripheral grooved member, a series or plurality of rollers and an additional annular ring member, said central member also having a diametrically reduced extension upon which fits said additional annular member having inwardly extending projections provided with screw threaded studs, said studs being equipped with nuts engaging said additional annular member, said rollers being received between said grooved peripheral member, said annular flange and said additional annular member.

2. A pulley or sheave comprising a central member having a rib or skeleton-like extension and also an axis-receiving opening and a series of crank-pin receiving openings extending through said skeleton-like extension and terminating flush with one face thereof, the opposite face of said central member being counter-sunk or recessed and having an annular perimetric flange, also a hub extending around said axis-receiving opening projecting slightly beyond the face of said central member, a grooved perimetric member encompassing said central member, a plurality of rollers interposed between said grooved member and said central member, said central member having its opposite face formed with a diametrically reduced extension and an additional annular member or ring encompassing said diametrically reduced extension, said diametrically reduced extension having inwardly extending projections provided with screw threaded studs, said studs being equipped with nuts engaging said additional annular member.

In testimony whereof I have signed my name to this specification in the presence of two subscribing witnesses.

JOHN EDWARD BORDENKIRCHER.

Witnesses:
JOSIAH BURNS,
GEO. W. RICE.